US009873512B2

(12) United States Patent
Mores et al.

(10) Patent No.: US 9,873,512 B2
(45) Date of Patent: Jan. 23, 2018

(54) AIRCRAFT FRAMEWORK STRUCTURE WITH INTEGRAL VENTILATION AIR DUCT

(71) Applicant: AIRBUS HELICOPTERS DEUTSCHLAND GMBH, Donauworth (DE)

(72) Inventors: Sebastian Mores, Munich (DE); Johann Barnerssoi, Poing (DE); Stefan Probst, Buchdorf (DE); Marco Schneeberger, Rosenheim (DE); Hartmut Jutt, Meitingen (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 174 days.

(21) Appl. No.: 14/810,774

(22) Filed: Jul. 28, 2015

(65) Prior Publication Data
US 2016/0031562 A1 Feb. 4, 2016

(30) Foreign Application Priority Data

Jul. 30, 2014 (EP) ..................................... 14400041

(51) Int. Cl.
*B64C 1/06* (2006.01)
*B64D 13/00* (2006.01)
(Continued)

(52) U.S. Cl.
CPC .............. *B64D 13/00* (2013.01); *B64C 1/061* (2013.01); *B64C 27/04* (2013.01); *B64D 13/08* (2013.01);
(Continued)

(58) Field of Classification Search
CPC ... B64C 2001/0072; B64C 1/06; B64C 1/061; B64C 1/064; B64C 1/065; B64C 1/068;
(Continued)

(56) References Cited

U.S. PATENT DOCUMENTS 2,310,941 A * 2/1943 Dewey ................... B64D 13/08
236/48 R
2,427,698 A * 9/1947 Arnhym ................. B64D 13/08
181/224

(Continued)

FOREIGN PATENT DOCUMENTS

CA 2740666 2/2012
EP 1510454 3/2005

(Continued)

OTHER PUBLICATIONS

Korean Notice of Preliminary Rejection, dated Sep. 27, 2016, Application 10-2015-0078760, Airbus Helicopters Deutschland GmbH, 3 pages.

(Continued)

Primary Examiner — Tien Q Dinh
Assistant Examiner — Michael A. Fabula
(74) Attorney, Agent, or Firm — Brooks Kushman P.C.

(57) ABSTRACT

An aircraft with a fuselage that comprises a framework structure having at least one hollow frame that is integrally formed in one piece and comprises fiber reinforced polymers, the at least one hollow frame defining an integrated ventilation air duct that is adapted for guiding ventilation air into the aircraft.

20 Claims, 5 Drawing Sheets

(51) Int. Cl.
  *B64C 27/04* (2006.01)
  *B64D 13/08* (2006.01)
  B64C 1/00 (2006.01)
  B64D 13/06 (2006.01)
(52) U.S. Cl.
  CPC *B64C 2001/0072* (2013.01); *B64D 2013/003* (2013.01); *B64D 2013/0625* (2013.01); *Y02T 50/433* (2013.01); *Y02T 50/44* (2013.01); *Y02T 50/56* (2013.01)
(58) Field of Classification Search
  CPC ...... B64D 13/00; B64D 13/006; B64D 13/08; B64D 2013/003; B64D 2013/0655; B64D 2013/0662; B64D 2013/0625; B64D 2013/0607; B64D 2013/0614; B64D 2013/0666; B64D 2013/064
  See application file for complete search history.

(56) References Cited

U.S. PATENT DOCUMENTS

| | | | | |
|---|---|---|---|---|
| 2,671,395 | A | * | 3/1954 | Demuth ............... F24F 13/062 119/304 |
| 2,755,638 | A | * | 7/1956 | Sevin ................... B64D 13/08 62/402 |
| 2,937,506 | A | * | 5/1960 | Stirlen ................. B64D 13/08 261/122.1 |
| 2,963,879 | A | * | 12/1960 | De Paravicini ....... B64D 13/08 62/197 |
| 3,359,881 | A | * | 12/1967 | Lamb .................. B60H 1/3407 296/93 |
| 3,740,905 | A | * | 6/1973 | Adams ................. B64C 1/067 165/231 |
| 4,053,126 | A | * | 10/1977 | Duret .................. B29C 33/04 244/117 R |
| 4,111,106 | A | | 9/1978 | Burns |
| 4,524,679 | A | * | 6/1985 | Lyons .................. F24F 13/065 251/352 |
| 4,531,695 | A | * | 7/1985 | Swinfield ............. B64C 1/068 244/119 |
| 4,726,285 | A | * | 2/1988 | Kelley ................. F24F 13/068 454/284 |
| 5,037,041 | A | | 8/1991 | Unterhitzenberger |
| 5,441,326 | A | | 8/1995 | Mikalonis |
| 5,524,848 | A | * | 6/1996 | Ellsworth ............. B64D 13/00 244/118.5 |
| 5,897,079 | A | * | 4/1999 | Specht ................. B64C 1/067 244/118.5 |
| 6,296,296 | B1 | | 10/2001 | Sekishiro et al. |
| 6,613,258 | B1 | * | 9/2003 | Maison ................ B29C 65/7882 156/189 |
| 8,096,503 | B2 | | 1/2012 | Verweyen |
| 8,262,023 | B2 | * | 9/2012 | Kofinger ............... B64C 1/066 244/118.5 |
| 8,376,444 | B2 | | 2/2013 | Scheib et al. |
| 8,800,921 | B2 | | 8/2014 | Gensch et al. |
| 8,955,804 | B2 | * | 2/2015 | Brownjohn ........... B64C 1/061 244/118.5 |
| 9,487,294 | B2 | * | 11/2016 | Umlauft ............... B64D 11/00 |
| 9,494,266 | B2 | * | 11/2016 | Sabadie ................ B64C 1/406 |
| 2005/0044712 | A1 | * | 3/2005 | Gideon ................. B60R 13/02 29/897.32 |
| 2007/0164158 | A1 | * | 7/2007 | Buchholz ............. B64C 1/068 244/119 |
| 2008/0185479 | A1 | * | 8/2008 | Brownjohn ........... B64C 1/1492 244/129.3 |
| 2009/0127393 | A1 | * | 5/2009 | Guzman .............. B29C 44/583 244/133 |
| 2009/0159746 | A1 | * | 6/2009 | Grauerholz ........... B64C 1/061 244/119 |
| 2009/0189018 | A1 | * | 7/2009 | Dittmar ................ B64C 1/066 244/121 |
| 2009/0230244 | A1 | * | 9/2009 | Kofinger ............... B64C 1/066 244/118.5 |
| 2009/0272849 | A1 | * | 11/2009 | Koefinger ............. B64C 1/066 244/131 |
| 2009/0298408 | A1 | * | 12/2009 | Reisbach .............. B64D 13/00 454/76 |
| 2010/0087130 | A1 | * | 4/2010 | Nitsche ................ B60H 1/00371 454/76 |
| 2010/0087131 | A1 | | 4/2010 | Stuetzer et al. |
| 2010/0148003 | A1 | | 6/2010 | Verweyen |
| 2010/0240290 | A1 | * | 9/2010 | Markwart ............. B64D 13/00 454/71 |
| 2010/0261422 | A1 | * | 10/2010 | Sakakibara ........... B60H 1/3414 454/155 |
| 2011/0011518 | A1 | * | 1/2011 | Carstensen ........... B64C 1/06 156/91 |
| 2011/0024561 | A1 | * | 2/2011 | Kofinger ............... B64C 1/066 244/119 |
| 2011/0024565 | A1 | * | 2/2011 | Koefinger ............. B64C 1/066 244/131 |
| 2011/0027526 | A1 | | 2/2011 | McCarville et al. |
| 2011/0126572 | A1 | * | 6/2011 | Peacos, III .......... B64D 13/00 62/291 |
| 2011/0138758 | A1 | * | 6/2011 | Hildebrand ........... B64D 13/00 55/440 |
| 2011/0147520 | A1 | * | 6/2011 | Schneider ............. B64D 11/00 244/118.5 |
| 2011/0155850 | A1 | * | 6/2011 | Noebel ................. B64C 1/18 244/119 |
| 2011/0237173 | A1 | * | 9/2011 | Kelnhofer ............. B64D 13/08 454/76 |
| 2011/0240796 | A1 | * | 10/2011 | Schneider ............. B64D 11/00 244/118.5 |
| 2011/0253836 | A1 | | 10/2011 | Hashberger |
| 2011/0266392 | A1 | * | 11/2011 | Goehlich .............. B64D 11/0015 244/118.6 |
| 2012/0118528 | A1 | * | 5/2012 | Al-Ali .................. B64D 13/08 165/41 |
| 2012/0119028 | A1 | * | 5/2012 | Griess .................. B64C 1/068 244/118.5 |
| 2012/0187245 | A1 | * | 7/2012 | Goehlich .............. B32B 5/32 244/119 |
| 2012/0199315 | A1 | * | 8/2012 | Barreau ................ B64C 1/067 165/42 |
| 2012/0199694 | A1 | * | 8/2012 | Rittner ................. B64D 11/00 244/118.5 |
| 2012/0248244 | A1 | | 10/2012 | Brownjohn et al. |
| 2012/0312921 | A1 | * | 12/2012 | Grosse-Plankermann B64D 11/003 244/118.5 |
| 2013/0005231 | A1 | * | 1/2013 | Schneider ............. B64D 13/00 454/76 |
| 2013/0009007 | A1 | * | 1/2013 | Tomasi ................. B64C 1/068 244/118.5 |
| 2013/0075539 | A1 | | 3/2013 | Seger et al. |
| 2013/0277901 | A1 | * | 10/2013 | Moje .................... B64C 1/06 269/1 |
| 2013/0286673 | A1 | * | 10/2013 | Umlauft ............... B64D 11/00 362/470 |
| 2014/0079905 | A1 | * | 3/2014 | Frankenberger ...... B64C 1/066 428/131 |
| 2014/0186588 | A1 | * | 7/2014 | Victorazzo ........... B64C 1/064 428/178 |
| 2014/0197271 | A1 | * | 7/2014 | Maloney .............. B60N 2/4242 244/17.21 |
| 2014/0238234 | A1 | * | 8/2014 | Horstman ............. B64D 13/06 95/39 |
| 2014/0299707 | A1 | * | 10/2014 | Conway ............... B64C 27/00 244/17.11 |
| 2015/0036368 | A1 | * | 2/2015 | Rittner ................. B64D 47/02 362/471 |
| 2015/0063995 | A1 | * | 3/2015 | Rivera ................. F04D 3/00 415/207 |
| 2015/0122939 | A1 | * | 5/2015 | Bistuer ................. B64C 1/061 244/17.11 |

(56) References Cited

U.S. PATENT DOCUMENTS

| | | | |
|---|---|---|---|
| 2015/0122940 A1* | 5/2015 | Mairou | B64D 1/22 244/17.11 |
| 2015/0217536 A1* | 8/2015 | Hoefle | B32B 1/08 428/34.5 |
| 2016/0368586 A1* | 12/2016 | Weimer | B64C 1/066 |

FOREIGN PATENT DOCUMENTS

| | | |
|---|---|---|
| EP | 2452872 | 5/2012 |
| GB | 487023 | 6/1938 |
| JP | 2009523644 A | 6/2009 |
| JP | 2010538890 A | 12/2010 |
| WO | 2012101439 | 8/2012 |
| WO | 2012152934 | 11/2012 |

OTHER PUBLICATIONS

European Search Report for EP 14400041, Completed by the European Patent Office on Dec. 19, 2014, 7 Pages.

Canadian Search Report dated May 2, 2016, Application No. 2,889,085, Applicant Airbus Helicopters Deutschland Gmbh, 4 Pages.

Japanese Search Report dated Mar. 29, 2016, Application No. 2015-086587, 2 Pages.

* cited by examiner

AIRCRAFT FRAMEWORK STRUCTURE WITH INTEGRAL VENTILATION AIR DUCT

CROSS REFERENCE TO RELATED APPLICATION

This application claims priority to European patent application No. EP 14 400041.1 filed on Jul. 30, 2014, the disclosure of which is incorporated in its entirety by reference herein.

BACKGROUND OF THE INVENTION (1) Field of the Invention

The invention is related to a rotary wing aircraft with a fuselage that comprises a framework structure having at least one hollow frame.

(2) Description of Related Art

A fuselage of an aircraft, and in particular of a rotorcraft, can at least partly be provided with a framework structure having one or more hollow frames in order to reduce an overall weight of the fuselage. Usually, such hollow frames consist of a plurality of hollow frame beams that are separately manufactured and subsequently assembled to define the framework structure. To this end, these separate hollow frame beams are interconnected during assembly at corresponding intersection points by means of suitable joints.

Such a fuselage is generally adapted to accommodate a basic ventilation system and an environmental control system, and can further be adapted to accommodate an air conditioning system. All these systems together have constituent parts and/or components that produce a flow of air at a specific spot in or on the aircraft, which is usually not the spot where the air should be expelled to cool or heat a certain region of the aircraft, such as its cockpit, or a selected component, such as a main window in the cockpit, or a person, such as the pilot of the aircraft. For instance, the document U.S. Pat. No. 5,037,041 describes a cockpit for a helicopter.

The aircraft ventilation and/or air conditioning systems generally consist of air generating components, which generate an air stream, e.g. pumps, fans and/or compressors, and of air ducts, which are implemented into the aircraft and, at least partly, accommodated in its fuselage in order to direct the generated air stream to a given region where it is expelled. The air ducts are realized by means of flexible hoses, tubes and/or pipes that are mounted to the fuselage and, thus, integrated into the aircraft volume.

However, such flexible hoses, tubes and/or pipes require a certain installation space that must be allocated and reserved in the aircraft. This installation space cannot be used for other purposes and, thus, further reduces an already limited available space in the aircraft.

The document US2010/0087131 describes an aircraft with air ducts that are at least partly implemented by means of dedicated tubes. These dedicated tubes are used to define air guide elements for connecting the air ducts that are bounded between overhead luggage compartment housing back walls and personal service ducts to a line system of an aircraft air conditioning system.

This aircraft air conditioning system, however, requires a comparatively large number of interconnected components. Accordingly, assembly of the aircraft air conditioning system is time-consuming and, therefore, expensive. Furthermore, due to the comparatively large number of interconnected components, this aircraft air conditioning system is prone to air leakage, leading to a reduced overall performance of the system.

The document US2012/0248244 describes a fuselage of an aircraft that is formed by load-bearing hollow structural elements, which are defined by longitudinal and transverse frames, as well as transverse beams. These longitudinal frames, transverse frames and transverse beams are interconnected at associated intersecting points to build up a lattice structure that is covered by an outer skin, thereby defining the shape of the fuselage. Furthermore, air ducts are integrated into the interconnected longitudinal frames, transverse frames and transverse beams and adapted to transport air for air conditioning purposes from an air conditioning system into a passenger compartment of the aircraft. Each such air duct is provided with one or more variable control valves for controlling respective flow cross sections of the air ducts, i.e. for controlling respective air flows and/or air pressures in the air ducts. Moreover, actuators such as pivoting flaps for controlling how an air stream is to be carried are provided in one or more of the intersecting points.

This lattice structure advantageously allows implementing an air conditioning system in a fuselage of an aircraft without requiring use of the above described flexible hoses, tubes and/or pipes. Thus, the installation space that would normally be required for these flexible hoses, tubes and/or pipes can be saved for other purposes.

However, the intersecting points where the longitudinal frames, transverse frames and transverse beams are respectively interconnected are prone to air leakage, as they would normally not fit perfectly to each other due to underlying manufacturing tolerances. Accordingly, the generated air stream that moves e.g. from an air duct in a longitudinal frame via an intersecting point into a transversal frame or beam would potentially leak at the intersecting point, therefore limiting the overall achievable performance of the air conditioning system. Furthermore, this lattice structure is not suitable for implementing an air conditioning or ventilating system in a cockpit region of an aircraft, which is structurally a very complex region, where generally no interconnectable longitudinal and transversal frames and/or beams exist.

The documents WO2012152934, CA2740666, US2011/0253836 and U.S. Pat. No. 5,441,326 also describe aircrafts that are provided with air ducts for air conditioning and/or ventilation purposes. According to these documents, the air ducts are integrated into available components of the aircrafts, such as insulating skin panels, cargo-fire-suppression agent distribution systems and/or overhead luggage bin modules.

Such an integration of air ducts into available components or structures is also known from other vehicles than aircrafts. For instance, the document U.S. Pat. No. 6,296,296 describes a door trim panel of a truck that is provided with an air duct of an associated air conditioning and/or ventilating system. The document U.S. Pat. No. 8,376,444 describes insert-molded structural air duct assemblies for cars.

The document EP1510454 describes a mobile platform interior panel having integrated ducts and insulation. The interior panel includes a body formed by an injection molding process, at least one duct integrated with the body and at least one layer of insulation also integrated with the body. The panel is formed using a low pressure forming process, such as reaction injection molding (RIM). The low pressure forming process allows the duct and insulation to be integrated with the body simultaneously with forming the panel from a material having desired insulating properties. The ducts are round in cross-section, have a substantially consistent cross-sectional area, and are straight along their length.

Other documents are to be considered: EP2452872, GB487023, U.S. Pat. No. 4,111,106, U.S. Pat. No. 5,037,041, U.S. Pat. No. 5,441,326, US2010/148003 and WO2012101439.

However, all of the above described air duct systems are more or less prone to air leakage. Furthermore, they are not suitable for implementing an air conditioning or ventilating system in an aircraft with reduced installation space requirements permitting its installation e.g. in a cockpit region of the aircraft, which inherently exhibits only limited available space

BRIEF SUMMARY OF THE INVENTION

It is, therefore, an object of the present invention to provide a new aircraft with an improved air conditioning and/or ventilating system.

This object is solved by a rotary wing aircraft with a fuselage that comprises a framework structure having at least one hollow frame, and may be provided by a cockpit framework structure.

More specifically, according to the invention an aircraft with a fuselage that comprises a framework structure having at least one hollow frame is provided, wherein the at least one hollow frame is integrally formed in one piece and comprises fiber reinforced polymers. Furthermore, said at least one hollow frame defines an integrated ventilation air duct that is adapted for guiding ventilation air into said aircraft.

It should be noted that in the context of the present invention the term "integrally formed in one piece" refers to a component that is manufactured as one single element and that cannot be split into two or more parts in a non-destructive manner. In other words, the at least one hollow frame of the framework structure of the inventive fuselage cannot be split into two or more constituent parts without destroying the at least one hollow frame, e.g. by sawing, cutting or breaking.

According to one aspect, a ventilation system of an aircraft is implemented into one or more basic frames of the aircraft in order to provide sufficient air to various regions of the aircraft by using only a reduced number of dedicated flexible hoses, tubes and/or pipes, and ideally by using no flexible hoses, tubes and/or pipes at all. To this end, the inventive fuselage and, more particularly, the at least one hollow frame is preferably defined by hollow interconnected beams that are assembled during manufacturing into one single element as described above, and which is used for air ducting. Therefore, each hollow section of these beams comprises slots and/or vents and/or adjustable nozzles through which air can be expelled onto a window or passenger/pilot or electronic component of a given aircraft.

In other words, the hollow sections form one single air duct that is used to expel air to several regions of the aircraft. This air is generated by a system which creates an air advection, e.g. a pump, fan, compressor, etc., which is commonly referred to as a ventilation system. This ventilation system could also include an environmental control system or an air-conditioning system.

The generated air, which is introduced into the at least one hollow frame of the framework structure, is ducted in an air tight cross-section of the hollow frame until defined air outlets expel the ducted air in order to provide a window, pilot, passenger and/or component of the aircraft with hot or cold air. A hot air supply can advantageously be used to support preconditioning, i.e. heating up, of aircraft components, such as the fuel system, the oil system, electrical components, e.g. computers, fuse boxes and so on, and/or mechanical components, e.g. gear boxes, engines and so on.

More specifically, frame integrated ducts are advantageously used for hot and cold air ducting, so that a reduced aircraft volume usage can be achieved due to a double usage of the framework structure, so that more space can be allocated for other aircraft items and components. Moreover, an improved pilots and/or passenger ventilation can be achieved since the at least one hollow frame is usually located nearby.

Furthermore, an overall weight of the aircraft can be reduced as the use of dedicated flexible hoses, tubes and/or pipes can be omitted, at least essentially. This omission also reduces maintenance costs, since breakage, rupture and/or abrasion of such dedicated flexible hoses, tubes and/or pipes will be avoided.

Advantageously, the inventive integrated ventilation air ducts can be combined with existing air intake geometry of the aircraft for de-icing or anti-icing. Thus, an improved de-icing performance and similarly an improved de-misting and/or de-fogging performance can be achieved due to an improved integration of corresponding air outlets close to the aircraft windows. This also increases safety and customer satisfaction since the aircraft windows are better and quicker de-iced, de-misted and/or de-fogged. Moreover, since de-icing and/or de-misting performances are improved respective on-ground times before flight can be shortened advantageously, thus resulting in reduced fuel consumption.

According to a preferred embodiment, said framework structure defines a cockpit framework structure for a cockpit of said aircraft, wherein said at least one hollow frame defines at least one hollow cockpit frame and wherein said integrated ventilation air duct is adapted for guiding said ventilation air into said cockpit.

According to a further preferred embodiment, said cockpit framework structure defines a load-bearing construction, wherein said fiber reinforced polymers comprise carbon fiber reinforced polymers.

However, it should be noted that such carbon fiber reinforced polymers are merely described by way of example and not for limiting the present invention thereto. Instead, other fiber reinforced polymers can likewise be applied, such as e.g. glass fiber reinforced polymers, basalt fiber reinforced polymers and/or aramid fiber reinforced polymers.

According to a further preferred embodiment, said at least one hollow cockpit frame comprises at least one ventilation air outlet that is adapted for expelling said ventilation air.

According to a further preferred embodiment, said at least one hollow cockpit frame is provided with at least one adjustable nozzle that is adapted for user-controlled expellation of said ventilation air.

According to one aspect, the at least one hollow cockpit frame comprises a plurality of ventilation air outlets. At least one of these ventilation air outlets can be implemented in a basic realization as a simple opening or hole provided in the at least one hollow cockpit frame. Furthermore, at least one of these ventilation air outlets can be implemented as a static nozzle, i.e. a fixedly targeted nozzle. Moreover, at least one of these ventilation air outlets can be implemented as an adjustable nozzle.

According to a further preferred embodiment, said at least one adjustable nozzle is sealingly integrated into said at least one hollow cockpit frame by means of screwing, gluing and/or bonding.

According to a further preferred embodiment, said at least one adjustable nozzle is provided with an associated internal scoop that is arranged in said at least one hollow cockpit frame inside said integrated ventilation air duct, said associated internal scoop being adapted for defining a predetermined air mass flow directed towards said at least one adjustable nozzle.

According to a further preferred embodiment, at least two adjustable nozzles are provided, each having an associated internal scoop, said associated internal scoops comprising different geometrical shapes.

According to a further preferred embodiment, said at least one hollow cockpit frame is at least partly provided with an inner air duct insulation insulating said integrated ventilation air duct, said inner air duct insulation being at least adapted for reducing heat dissipation relative to said integrated ventilation air duct.

Such inner air duct insulation is particularly beneficial if the integrated ventilation air duct can be provided with air generated from a heating or a cooling machine to guide hot or cold air, as this will lead to temperature variations with respect to corresponding outside environmental conditions of the aircraft. Advantageously, such inner air duct insulation prevents warm air to dissipate heat over the inventive framework structure to the outside ambient air when hot air is guided in the integrated ventilation air duct. Likewise, such inner air duct insulation prevents retrieval of heat from the ambient air when the integrated ventilation air duct guides cold air.

According to a further preferred embodiment, said inner air duct insulation comprises air-injected foam.

According to a further preferred embodiment, said inner air duct insulation comprises a rubber tube.

According to a further preferred embodiment, said at least one hollow cockpit frame comprises at least one condense water drainage that is adapted for removing condense water occurring in said integrated ventilation air duct in operation.

This condense water may result in fouling odors and/or corrosion on metallic parts provided with the at least one hollow frame if it is not removed from the at least one hollow frame. Accordingly, by removing the condense water from the integrated ventilation air duct, such fouling odor and corrosion problems can easily and efficiently be handled.

According to a further preferred embodiment, said at least one condense water drainage comprises at least one condense water outlet.

According to a further preferred embodiment, said at least one condense water outlet is provided with at least one associated outlet cover, said at least one associated outlet cover being adapted for preventing a ventilation air flow leakage in the region of said at least one condense water outlet.

According to a further preferred embodiment, said at least one associated outlet cover is adapted for allowing a condense water stream inside said integrated ventilation air duct in a direction that is opposed to a ventilation air stream generated by said ventilation air.

The present invention further provides a cockpit framework structure for a cockpit of an aircraft, said cockpit framework structure having at least one hollow cockpit frame that is integrally formed in one piece and comprises fiber reinforced polymers, said at least one hollow cockpit frame defining an integrated ventilation air duct that is adapted for guiding ventilation air.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
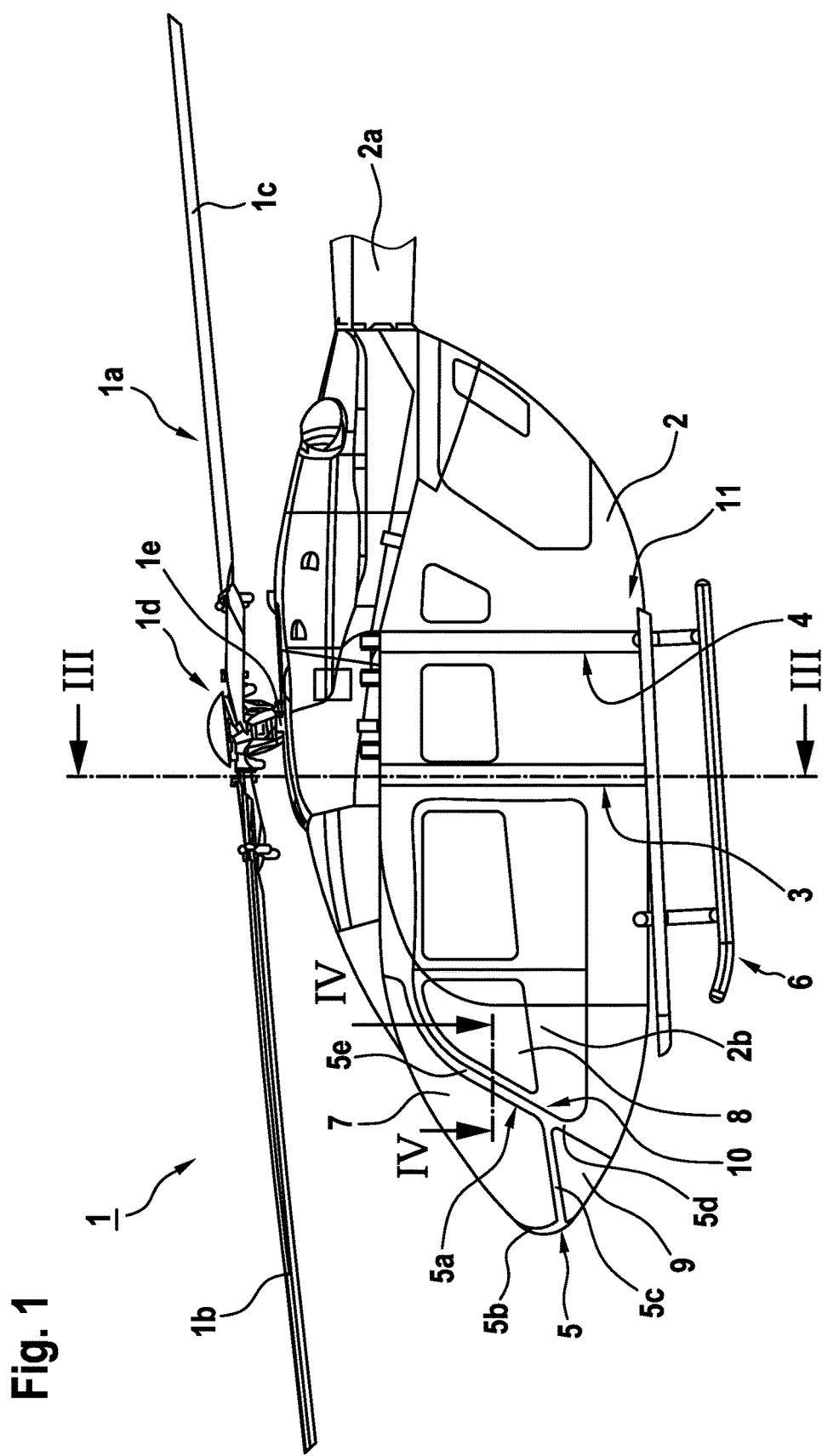
FIG. 1 shows a side view of an aircraft with a framework structure having at least one hollow frame according to the invention.

FIG. 1 shows an aircraft 1 according to one aspect of the invention, which comprises a fuselage 2 having a framework structure 5 with at least one hollow frame 5a. Illustratively, the fuselage 2 is connected to a landing gear 6 and defines, by way of example, at least a tail boom 2a and a cockpit 2b. For simplicity and clarity of the drawings, the tail boom 2a is cut away and not shown in greater detail.

The aircraft 1 is exemplarily embodied as a rotary-wing aircraft and, in particular, as a helicopter. Therefore, the aircraft 1 is also referred to hereinafter as the "helicopter 1" for simplicity and clarity. It should, however, be noted that the present invention is not limited to helicopters and can likewise be applied to other aircrafts having a fuselage that comprises a framework structure with at least one hollow frame according to the invention.

The helicopter 1 illustratively comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

Furthermore, the helicopter 1 may comprise one or more counter-torque devices configured to provide counter-torque during operation, i.e. to counter the torque created by rotation of the at least one multi-blade main rotor 1a for purposes of balancing the helicopter 1 in terms of yaw. The at least one counter-torque device can be provided at the tail boom 2a, which may further be provided e.g. with a horizontal stabilizer, a bumper, a tail wing and/or a fin.

According to one aspect, the fuselage 2 defines a subfloor region 11 of the helicopter 1, which may accommodate fuel cells, electrical installations, air ducts and so on. The fuselage 2 preferably comprises at least three interconnected fuselage frames: a fuselage mid-section frame 3, a fuselage aft section frame 4 and a fuselage front section frame. The latter is implemented by the at least one hollow frame 5a and defines the framework structure 5 at least partly.

The framework structure 5 preferably and illustratively defines at least a cockpit framework structure and is, therefore, hereinafter also referred to as the "cockpit framework structure 5" for simplicity and clarity. Accordingly, the at least one hollow frame 5a preferably and illustratively defines at least a cockpit frame and is, therefore, hereinafter also referred to as the "hollow cockpit frame 5a" for simplicity and clarity. However, the present invention is not limited to an application to cockpit framework structures and frames and can likewise be applied to other hollow frames of an aircraft's fuselage.

The hollow cockpit frame 5a is preferably connected to a door frame 10 and adapted to accommodate at least one main window 7. The hollow cockpit frame 5a may further be adapted to accommodate one or more secondary windows 9. The door frame 10 is preferably adapted to accommodate at least one door window 8.

According to one aspect, the hollow cockpit frame 5a comprises one or more frame beams 5b, 5c, 5d, 5e. These frame beams 5b, 5c, 5d, 5e are interconnected during manufacturing such that the hollow cockpit frame 5a is integrally formed in one piece. In other words, the hollow cockpit frame 5a is manufactured as one single element that cannot be split into two or more parts in a non-destructive manner. Therefore, in the following any reference to the individual frame beams 5b, 5c, 5d, 5e is avoided for clarity and reference is only made to the hollow cockpit frame 5a as a single piece or component.

Preferably, the hollow cockpit frame 5a is entirely made of fiber composites in a fiber production process and described by individual cross sections that are adapted to withstand the stress and load which will occur during the helicopter's lifetime. Preferentially, the fiber composites comprise carbon fiber reinforced polymers. Alternatively, or additionally, the fiber composites may comprise glass fiber reinforced polymers, basalt fiber reinforced polymers, aramid fiber reinforced polymers and/or any other suitable fiber reinforced polymers that are applicable in aircraft construction.

The hollow cockpit frame 5a and, more generally, the cockpit framework structure 5 is a so-called "primary structure", which defines a load-bearing construction that is adapted to absorb forces acting thereon. As mentioned above, the cockpit framework structure 5 and, more particularly, the hollow cockpit frame 5a comprises a hollow cross-section and usually does not fulfil any other function than the force absorption.

Figure 2:
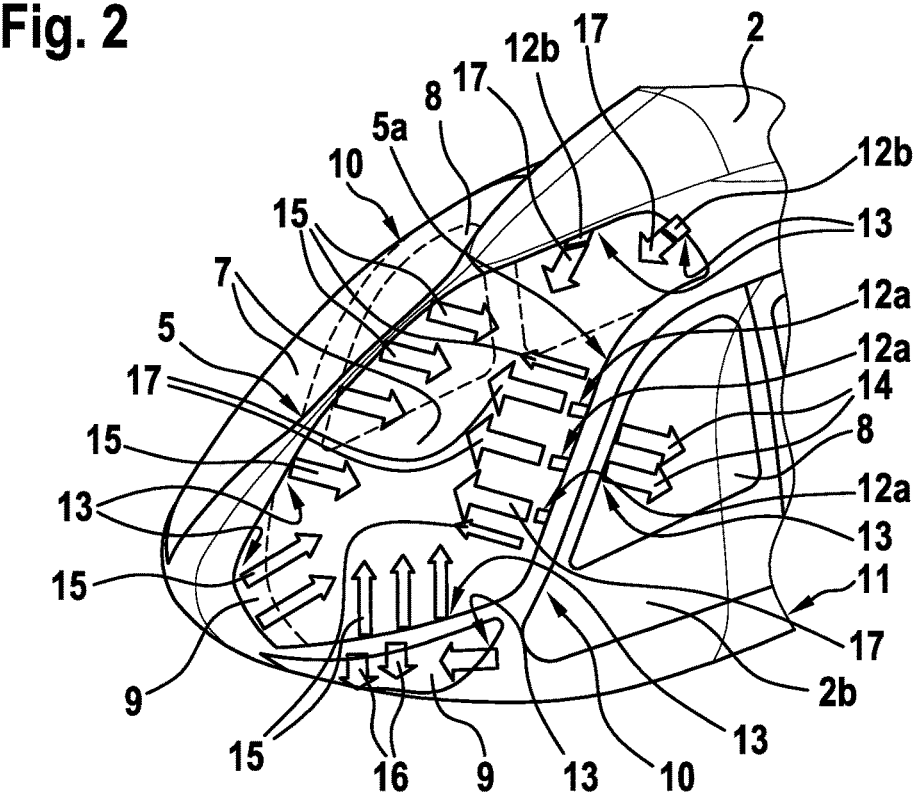
FIG. 2 shows a first perspective view of the framework structure of FIG. 1.

FIG. 2 shows a section of the fuselage 2 of FIG. 1 for illustrating the cockpit framework structure 5 with the hollow cockpit frame 5a, which defines the cockpit 2b of the helicopter 1 of FIG. 1, in greater detail. Illustratively, the hollow cockpit frame 5a is connected to two opposite door frames 10 and accommodates two main windows 7 and two secondary windows 9, while each door frame 10 accommodates an associated door window 8.

According to one aspect, at least the hollow cockpit frame 5a is adapted for guiding ventilation air 15, 16, 17 into the helicopter 1 of FIG. 1 in operation and, more specifically, at least into the cockpit 2b. Since the entire cockpit framework structure 5, i.e. the entire hollow cockpit frame 5a, is defined by hollow cross-sections, this ventilation air 15, 16, 17 can be ducted into all regions of the cockpit framework structure 5 and, more generally, of the fuselage 2 in order to provide air to all desired locations of the helicopter 1 of FIG. 1. Preferably, the hollow cross-sections of the cockpit framework structure 5 are essentially rectangular.

The cockpit framework structure 5 and, more specifically, the hollow cockpit frame 5a comprises preferably at least one and preferentially a plurality of ventilation air outlets 13 that are each adapted for expelling said ventilation air 15, 16, 17 in operation. Illustratively, main window ventilation air 15 is expelled onto the main windows 7 in operation, secondary window ventilation air 16 is expelled onto the secondary windows 9 in operation and pilot ventilation air 17 is expelled in the direction of a presumed pilot location in operation.

Preferably, at least one of the ventilation air outlets 13 is implemented as a simple opening or a hole provided in the hollow cockpit frame 5a, as a static nozzle, i.e. a fixedly targeted nozzle, or as an adjustable nozzle. By way of example, the ventilation air outlets 13 that expel the main window ventilation air 15 and the secondary window ventilation air 16 are implemented as openings or holes and/or as static nozzles.

However, since pilots vary in size and preference, they may need an adjustment in air expelling velocity and direction. Accordingly, the ventilation air outlets 13 that expel the pilot ventilation air 17 are preferably implemented as adjustable nozzles 12a, 12b provided e.g. on a side and on top of the main window 7. These adjustable nozzle 12a, 12b are preferably sealingly integrated into the hollow cockpit frame 5a by means of screwing, gluing and/or bonding and are adapted for user-controlled expellation of the pilot ventilation air 17.

It should be noted that expelling of ventilation air was described above only with reference to the hollow cockpit frame 5a. However, ventilation air can also be expelled from the door frames 10 as well as any other door frame and/or from the fuselage mid-section frame 3 and/or the fuselage aft section frame 4 of FIG. 1. By way of example, at least one of the door frames 10 is provided with ventilation air outlets 13 that expel door window ventilation air 14 onto the associated door window 8 in operation.

Figure 3:
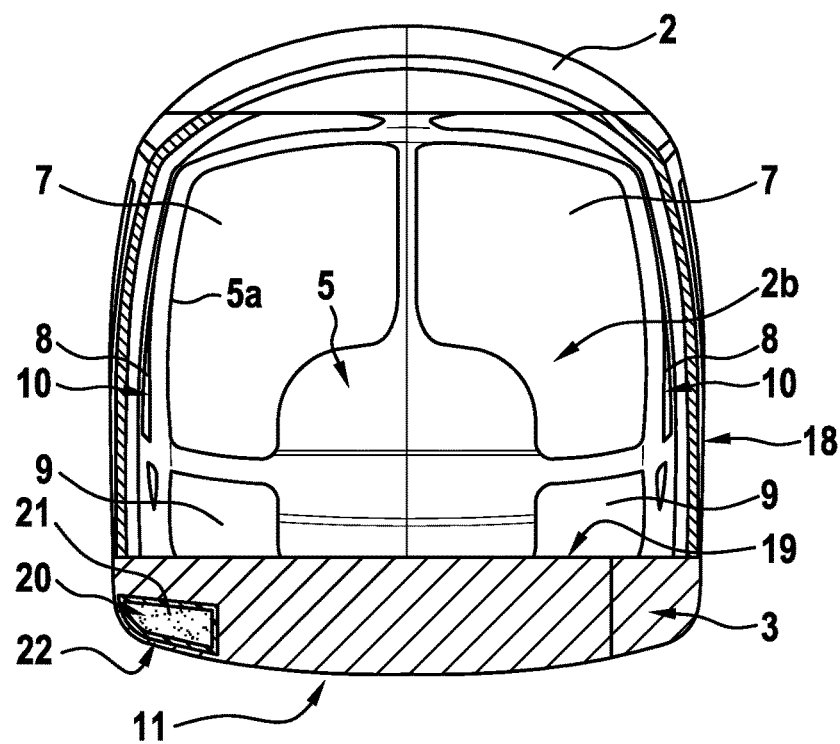
FIG. 3 shows a sectional view of the framework structure of FIG. 1, seen along section line III-III of FIG. 1.

FIG. 3 shows a section of the fuselage 2 of FIG. 1 with the cockpit framework structure 5 and the hollow cockpit frame 5a, for illustrating the fuselage mid-section frame 3 and the subfloor region 11 of the helicopter 1 of FIG. 1 in greater detail. Preferably, the fuselage 2 is provided with an aircraft outer skin 18 that encompasses at least the fuselage mid-section frame 3.

According to one aspect, the subfloor region 11 is provided in an area between the fuselage 2 and a cabin floor 19 of the helicopter 1 of FIG. 1. Preferably, one or more longitudinal frame integrated air ducts 20 are arranged or formed in the subfloor region 11 for guiding ventilation air 21 at least to the hollow cockpit frame 5a, but preferentially also to the fuselage mid-section frame 3 and/or the fuselage aft section frame 4 of FIG. 1. At least one and preferably each one of the one or more longitudinal frame integrated air ducts 20 is preferentially provided with an inner air duct insulation 22 that is at least adapted for reducing heat dissipation and/or retrieval relative to said longitudinal frame integrated air duct 20.

Figure 4:
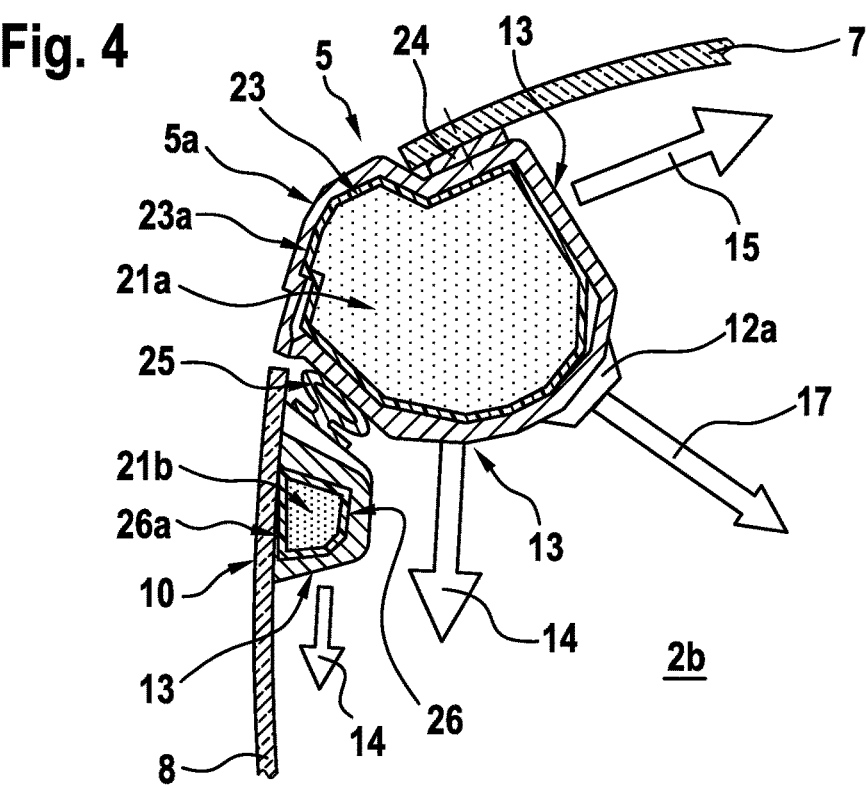
FIG. 4 shows a sectional view of the framework structure of FIG. 1, seen along section line IV-IV of FIG. 1.

FIG. 4 shows a cross-section of the cockpit framework structure 5 and the hollow cockpit frame 5a of FIG. 1 to FIG. 3, which defines the cockpit 2b of the helicopter 1 of FIG.

1 and to which a door frame 10 of FIG. 1 to FIG. 3 is connected. The hollow cockpit frame 5a is provided with a main window 7 and the door frame 10 is provided with a door window 8.

The main window 7 is illustratively fixed to the hollow cockpit frame 5a by means of a suitable fixation 24, which preferably seals the main window 7 at least partly to the hollow cockpit frame 5a in order to avoid at least infiltration of humidity, dust particles and/or cold air masses into the cockpit 2b, in operation. The door frame 10 is mounted to the hollow cockpit frame 5a by means of suitable hinges and preferentially sealed by means of a suitable sealing 25.

It should be noted that only the fixation of the main window 7 to the hollow cockpit frame 5a is illustrated in greater detail. However, the secondary window 9 of FIG. 1 to FIG. 3 can be mounted to the hollow cockpit frame 5a in a similar manner. This likewise applies to the door window 8, which can also be mounted in a similar manner to the door frame 10.

According to one aspect, the hollow cockpit frame 5a defines an integrated ventilation air duct 23 that is adapted for guiding cockpit ventilation air 21a that is expelled, in operation, as the main window ventilation air 15, the secondary window ventilation air 16 and the pilot ventilation air 17 of FIG. 2. Similarly, the door frame 10 defines a door frame integrated ventilation air duct 26 that is adapted for guiding door ventilation air 21b that is expelled, in operation, as the door window ventilation air 14 of FIG. 2.

Preferably, the hollow cockpit frame 5a is at least partly provided, i.e. lined, with an inner air duct insulation 23a insulating the integrated ventilation air duct 23. More specifically, the cockpit ventilation air 21a can be produced by a heating machine, i.e. a hot air source, or by a cooling machine, i.e. a cold air source, both of which are not shown for simplicity of the drawings, as they are well known to the person skilled in the art. However, both variants may lead to temperature differences between the cockpit ventilation air 21a and outside environmental conditions of the helicopter 1 of FIG. 1 and/or inside conditions in the cockpit 2b.

Therefore, the inner air duct insulation 23a is preferably at least adapted for reducing heat dissipation relative to the integrated ventilation air duct 23, i.e. to the ambient air, if the latter is connected to a hot air source so that hot air is guided therein. The inner air duct insulation 23a is preferably further adapted for reducing retrieval of heat from the ambient air, if the integrated ventilation air duct 23 is connected to a cold air source so that cold air is guided therein. An inner air duct insulation 26a having a similar functioning is preferably at least partly provided in the door frame integrated ventilation air duct 26.

According to one aspect, the inner air duct insulation 23a and/or the inner air duct insulation 26a comprise air-injected foam. Such air-injected foam can be introduced into the integrated ventilation air duct 23 and/or the door frame integrated ventilation air duct 26 after manufacturing of the hollow cockpit frame 5a and the door frame 10 by means of a fiber production process, as described above.

Alternatively, or additionally, the inner air duct insulation 23a and/or the inner air duct insulation 26a may comprise a rubber tube. Such a rubber tube can be provided inside the hollow cockpit frame 5a and the door frame 10 during a fiber production process, in order to guarantee production of their hollow cross sections, as explained in more detail below with reference to the hollow cockpit frame 5a.

More specifically, as the cockpit framework structure 5 and, thus, the hollow cockpit frame 5a represents a relatively complex geometrical structure with all its kinks, curvatures and crossings, it can be beneficial to manufacture the hollow cockpit frame 5a and, consequently, the integrated ventilation air duct 23 together with the inner air duct insulation 23a integrated there into during the entire fiber production process. This will avoid placing the inner air duct insulation 23a into the complex geometrical structure afterwards.

To this end, in a preferred fiber production process, inflatable rubber tubes, which are e.g. air or oil inflated, are used to define an inner shape of the hollow cockpit frame 5a and, thus, of the integrated ventilation air duct 23. These inflatable tubes are required during the fiber production process in order to provide an inner pressure onto the fiber mat layup. Instead of removing these inflatable rubber tubes after finishing of the fiber production process, they can be used as the inner air duct insulation 23a according to one aspect.

Figure 5:
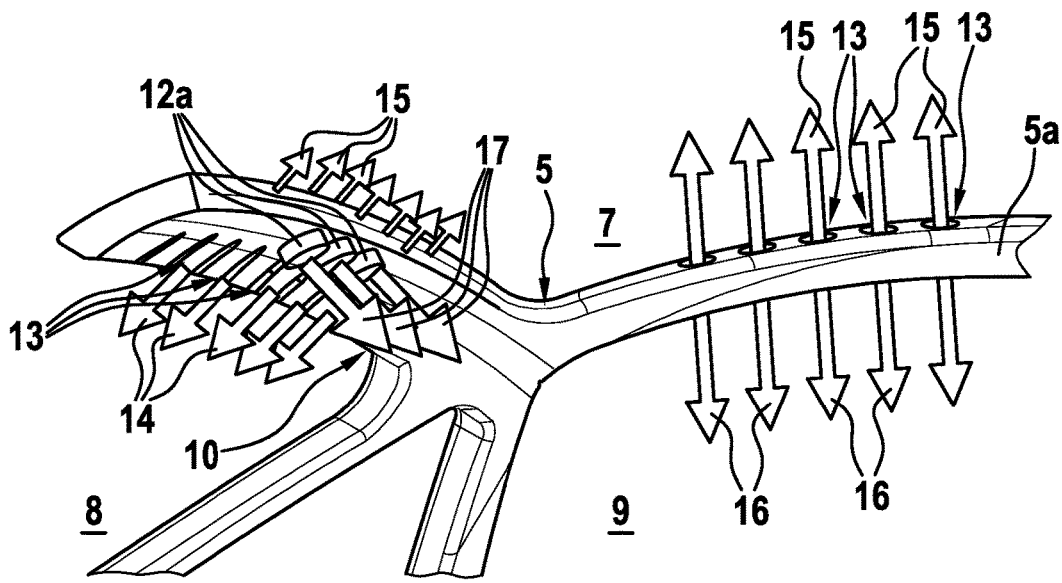
FIG. 5 shows a perspective view of an enlarged part of the framework structure of FIG. 1.

FIG. 5 shows a section of the cockpit framework structure 5 with the hollow cockpit frame 5a and the door frame 10 of FIG. 1 to FIG. 3 for illustrating the ventilation air outlets 13 and the adjustable side nozzles 12a in greater detail. FIG. 5 further clarifies the integral form in one piece of the hollow cockpit frame 5a, as well as expellation of the door window ventilation air 14, the main window ventilation air 15, the secondary window ventilation air 16 and the pilot ventilation air 17 of FIG. 2 from the hollow cockpit frame 5a and the door frame 10, in operation.

Figure 6:
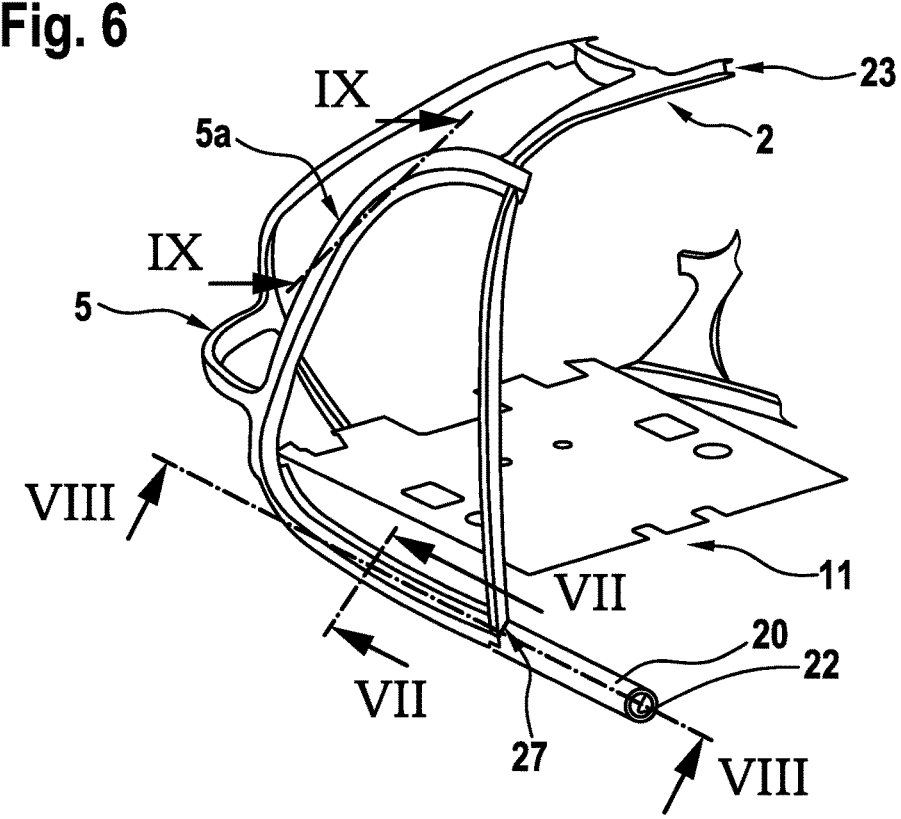
FIG. 6 shows a perspective view of the at least one hollow frame of the framework structure of FIG. 1.

FIG. 6 shows a section of the fuselage 2 of FIG. 1 to FIG. 3 for further illustrating the subfloor region 11 and the cockpit framework structure 5 with the hollow cockpit frame 5a having the integrated ventilation air duct 23. The hollow cockpit form 5a is integrally formed in one piece, as described above.

According to one aspect, the hollow cockpit frame 5a and, more specifically, the integrated ventilation air duct 23 is connected to the longitudinal frame integrated duct 20 provided in the subfloor region 11 by means of a suitable air duct interface 27. Thus, ventilation air that is generated e.g. by an air generating machine positioned in an aft section of the helicopter 1 of FIG. 1 can be supplied to the hollow cockpit frame 5a. However, in order to avoid air leakage, the suitable air duct interface 27 must be adapted for sealingly connecting the longitudinal frame integrated duct 20 to the integrated ventilation air duct 23 in an air-tight manner.

Figure 7:
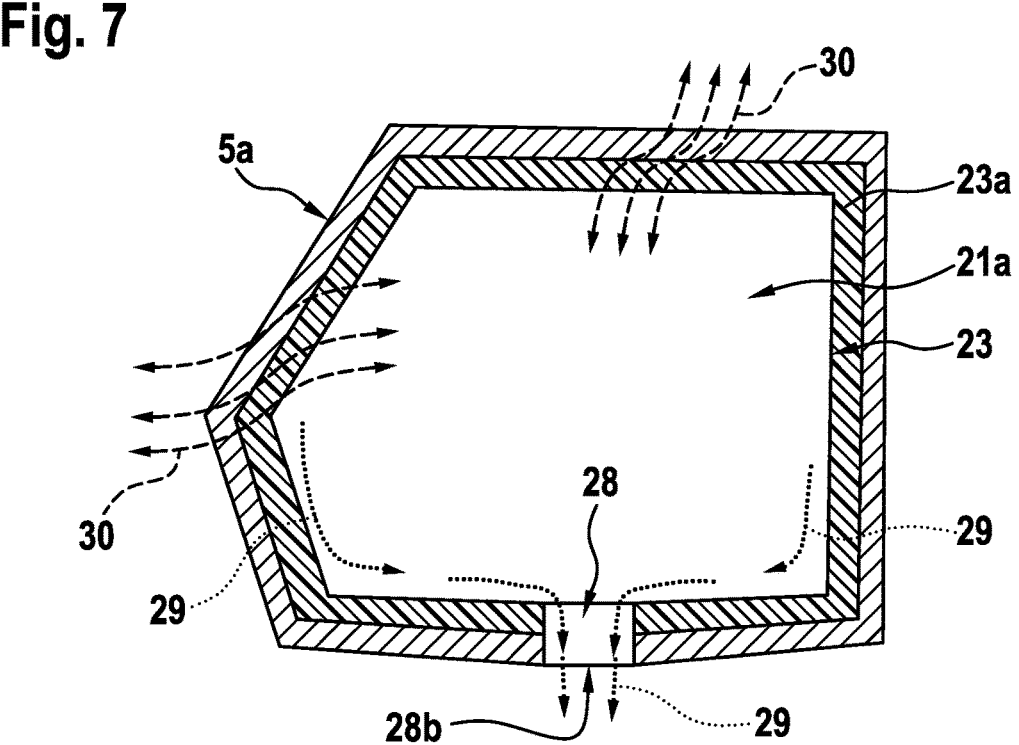
FIG. 7 shows a sectional view of the at least one hollow frame of FIG. 6, seen along section line VII-VII of FIG. 6.

FIG. 7 shows a cross-section of the hollow cockpit frame 5a of FIG. 1 to FIG. 6, which defines the integrated ventilation air duct 23 that is provided, i.e. lined, with the inner air duct insulation 23a according to FIG. 4. The integrated ventilation air duct 23 illustratively comprises a pentagonal cross sectional shape, which is often used in the aircraft industry. It should, however, be noted that this pentagonal cross sectional shape is arbitrarily selected for purposes of illustration and can, more generally, range from a simpler, e.g. circular cross sectional shape to any other, even highly-complex geometry.

According to one aspect, the hollow cockpit frame 5a and, thus, the integrated ventilation air duct 23 comprises at least one condense water drainage 28 that is adapted for removing condense water 29 occurring in the integrated ventilation air duct 23 in operation. More specifically, as described above with reference to FIG. 4, the inner air duct insulation 23a can generally be adapted to reduce heat dissipation or heat retrieval. However, as such heat dissipation or heat retrieval cannot be avoided completely in all operating conditions, a corresponding heat dissipation or heat retrieval remainder 30 can occur in operation and lead to the occurrence of the condense water 29.

The condense water 29 can lead to fouling odors as well as corrosion issues on metallic parts of the integrated ventilation air duct 23, i.e. the hollow cockpit frame 5a, if it is not removed. Therefore, the one or more condense water drainages 28 are provided in order to remove the condense water 29. These condense water drainages 28 are preferably provided with one or more condense water outlets 28b that are preferentially located at the lowest regions of the hollow cockpit frame 5a.

It should be noted that the condense water drainages 28 can lead to an undesired leakage of the cockpit ventilation air 21a, meaning that a pressure drop can occur due to these condense water drainages 28. However, they are necessary to avoid the above mentioned problems and should therefore be constructed in a manner that eliminates or at least reduces the undesired leakage as much as possible, as described hereinafter.

Figure 8:
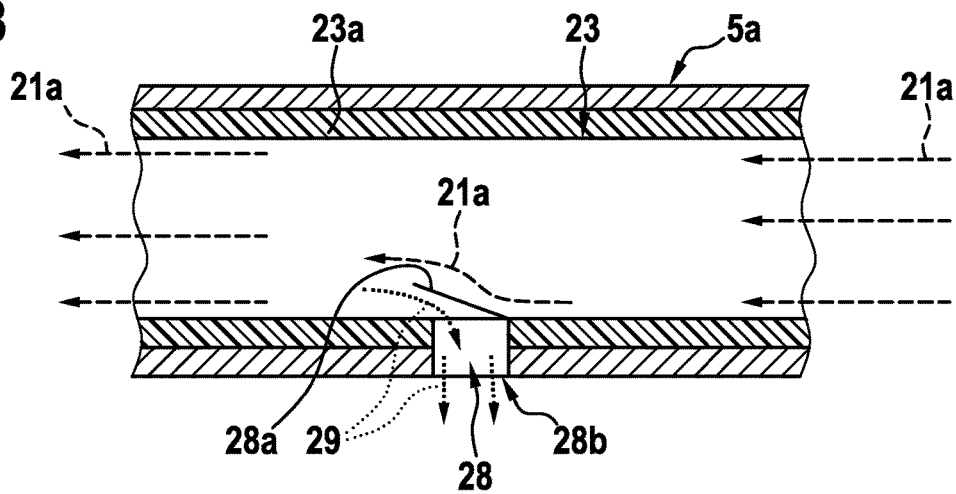
FIG. 8 shows a sectional view of the at least one hollow frame of FIG. 6, seen along section line VIII-VIII of FIG. 6.

FIG. 8 shows a cross-section of the hollow cockpit frame 5a of FIG. 1 to FIG. 6, which defines the integrated ventilation air duct 23 that is provided, i.e. lined, with the inner air duct insulation 23a according to FIG. 4. The hollow cockpit frame 5a is illustratively oriented horizontally and comprises the condense water drainage 28 with the condense water outlet 28b according to FIG. 7. The latter is provided with an associated outlet cover 28a, which is preferably adapted for preventing a ventilation air flow leakage in the region of the condense water outlet 28b.

More specifically, since an underlying air flow direction of the cockpit ventilation air 21a that streams in the integrated ventilation air duct 23 in operation is known, unnecessary pressure losses of the air can easily be avoided by arranging the associated outlet cover 28a such that a condense water stream of the condense water 29 inside the integrated ventilation air duct 23 is forced to flow in a direction into the condense water outlet 28b that is opposed to the air flow direction. Thus, the associated outlet cover 28a prevents the cockpit ventilation air 21a to leak out of the integrated ventilation air duct 23 at the condense water outlet 28b, yet will allow the condense water 29 to pass through the condense water outlet 28b to the ambient environment.

Figure 9:
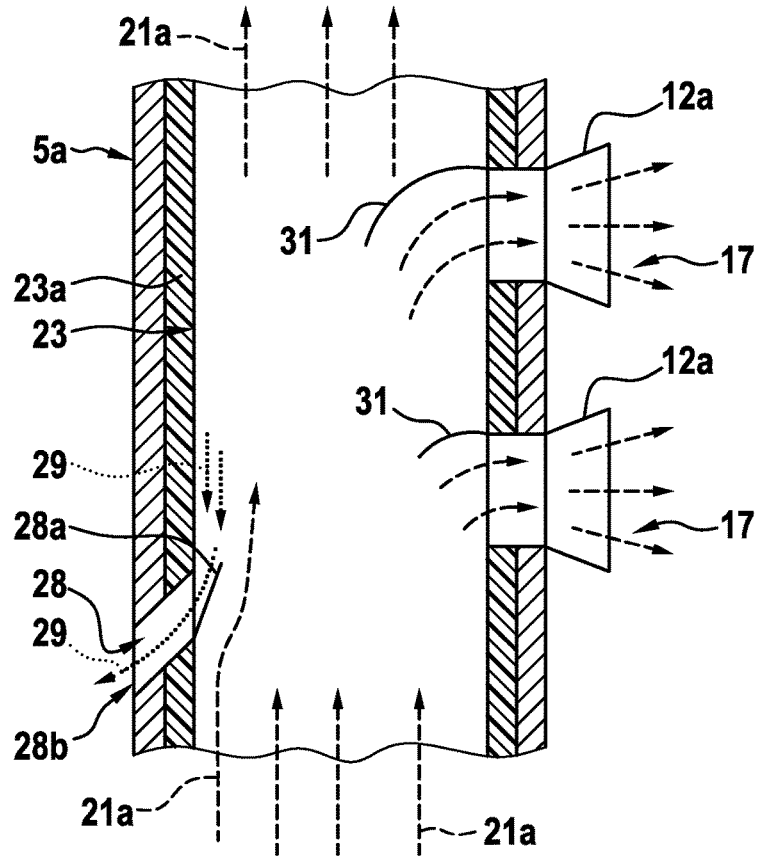
FIG. 9 shows a sectional view of the at least one hollow frame of FIG. 6, seen along section line IX-IX of FIG. 6.

FIG. 9 shows a cross-section of the hollow cockpit frame 5a of FIG. 1 to FIG. 6, which defines the integrated ventilation air duct 23 that is provided, i.e. lined, with the inner air duct insulation 23a according to FIG. 4. The hollow cockpit frame 5a is illustratively oriented vertically and comprises the condense water drainage 28 with the condense water outlet 28b and the associated outlet cover 28a according to FIG. 8. By way of example, the vertically oriented hollow cockpit frame 5a further comprises two of the adjustable nozzles 12a according to FIG. 2, FIG. 4 or FIG. 5.

According to one aspect, at least one of the adjustable nozzles 12a is provided with an associated internal scoop 31 that is arranged in the hollow cockpit frame 5a inside the integrated ventilation air duct 23. This associated internal scoop 31 is preferably adapted for defining a predetermined air mass flow directed towards the at least one of the adjustable nozzles 12a.

More specifically, an underlying air mass flow for the pilot ventilation air 17 exiting the at least one of the adjustable nozzles 12a is extracted from the cockpit ventilation air 21a that streams in the integrated ventilation air duct 23. In order to improve this extraction and to define the predetermined mass flow, the associated internal scoop 31 redirects the cockpit ventilation air 21a in operation to the at least one of the adjustable nozzles 12a. By modifying an underlying geometrical shape of the associated internal scoop 31, the predetermined air mass flow can be adjusted, as explained below.

By way of example, two adjustable nozzles 12a are provided. Each one of the two adjustable nozzles 12a has an associated internal scoop 31 and both associated internal scoops 31 have different geometrical shapes. Illustratively, one of the two adjustable nozzles 12a has approximately half of the dimensions than the other adjustable nozzle 12a. Accordingly, the other adjustable nozzle 12a receives a greater air mass flow.

As explained above, the condense water drainage 28 is adapted to remove the condense water 29 from the integrated ventilation air duct 23. In the illustrated case of an at least essentially vertically oriented, integrated ventilation air duct 23, the condense water 29 moves, due to the gravitational force, downward, whereas the cockpit ventilation air 21a streams upward. In this case, the associated outlet cover 28a can be configured as a condense water collector that collects and redirects the condense water 29 through the condense water outlet 28b.

It should be noted that modifications to the above described embodiments are within the common knowledge of the person skilled in the art and, thus, also considered as being part of the present invention. For instance, arrangement and orientation of the condense water outlet(s) and the associated outlet cover(s) can be optimized dependent on application-specific geometrical shapes and configurations of the hollow cockpit frame. This likewise applies to form and shapes of the internal scoops. Moreover, number and size of the air outlets and nozzles can be varied in an application-specific manner, and so on.

It should further be noted that the above description essentially describes the present invention with reference to the hollow cockpit frame. However, the present invention may likewise be applied to other hollow frames and/or framework structures in any aircraft and even in other vehicles than aircrafts.

REFERENCE LIST

| | |
|---|---|
| 1 | aircraft |
| 1a | main rotor |
| 1b, 1c | rotor blades |
| 1d | rotor head |
| 1e | rotor shaft |
| 2 | fuselage |
| 2a | tail boom |
| 2b | cockpit |
| 3 | fuselage mid-section frame |
| 4 | fuselage aft section frame |
| 5 | cockpit framework structure |
| 5a | fuselage front section frame (cockpit frame) |
| 5b, 5c, 5d, 5e | cockpit frame beams |
| 6 | landing gear |
| 7 | main window |
| 8 | door window |
| 9 | secondary window |
| 10 | door frame |
| 11 | subfloor region |
| 12a | adjustable side nozzles |
| 12b | adjustable top nozzles |
| 13 | air outlets |
| 14 | door window ventilation air |
| 15 | main window ventilation air |
| 16 | secondary window ventilation air |
| 17 | pilot ventilation air |
| 18 | aircraft outer skin |

-continued

| | |
|---|---|
| 19 | cabin floor |
| 20 | longitudinal frame integrated duct |
| 21 | guided ventilation air |
| 21a | cockpit frame guided ventilation air |
| 21b | door frame guided ventilation air |
| 22 | longitudinal frame integrated duct insulation |
| 23 | cockpit frame integrated air duct |
| 23a | cockpit frame integrated air duct insulation |
| 24 | main window fixation |
| 25 | door sealing |
| 26 | door frame integrated air duct |
| 26a | door frame integrated air duct insulation |
| 27 | air duct interface |
| 28 | condense water drain |
| 28a | outlet cover |
| 28b | condense water outlet |
| 29 | condense water |
| 30 | dissipated or retrieved heat remainder |
| 31 | internal scoops |

What is claimed is:

1. An aircraft with a fuselage that comprises:
a framework structure having a hollow frame with at least two interconnected beams being integrally formed as a unitary structure comprising fiber reinforced polymers in one composite piece, the hollow frame defining an integrated ventilation air duct that is configured to receive ventilation air from a ventilation system and guide ventilation air therethrough and into the aircraft via a ventilation air outlet defined by the hollow frame; wherein the hollow frame comprises at least one condense water drainage and corresponding condense water outlet that is configured to remove condense water occurring in the integrated ventilation air duct in operation.

2. The aircraft according to claim 1, wherein the framework structure defines a cockpit framework structure for a cockpit of the aircraft, wherein the at least two interconnected beams of the hollow frame provide a curved geometrical structure and wherein the integrated ventilation air duct is configured to guide the ventilation air to the outlet and into the cockpit.

3. The aircraft according to claim 2, wherein the at least two interconnected beams of the cockpit framework structure define a load-bearing construction, wherein the fiber reinforced polymers comprise carbon fiber reinforced polymers.

4. The aircraft according to claim 2, wherein the ventilation air outlet of the hollow cockpit frame is provided with an adjustable nozzle that is adapted for user-controlled expellation of the ventilation air into the cockpit.

5. The aircraft according to claim 4, wherein the adjustable nozzle is sealingly integrated into the hollow cockpit frame by means of screwing, gluing and/or bonding.

6. The aircraft according to claim 4, wherein the adjustable nozzle is provided with an associated internal scoop that is arranged in the hollow cockpit frame inside the integrated ventilation air duct, the internal scoop configured to define and direct a predetermined air mass flow towards the adjustable nozzle.

7. The aircraft according to claim 2, wherein the hollow frame defines the ventilation air outlet and another ventilation air outlet, and
wherein the ventilation air outlet is provided with an adjustable nozzle and the another ventilation air outlet is provided with another adjustable nozzle, each adjustable nozzle having an associated internal scoop, the associated internal scoops comprising different geometrical shapes to define and direct different predetermined air mass flows towards each associated adjustable nozzle.

8. The aircraft according to claim 2, wherein the hollow cockpit frame is at least partly provided with an inner air duct insulation insulating the integrated ventilation air duct; and
wherein the inner air duct insulation being configured to reduce heat dissipation relative to the integrated ventilation air duct.

9. The aircraft according to claim 8, wherein the inner air duct insulation comprises air-injected foam.

10. The aircraft according to claim 8, wherein the inner air duct insulation comprises a rubber tube.

11. The aircraft according to claim 1, wherein the at least one condense water outlet is provided with at least one associated outlet cover; and
wherein the at least one associated outlet cover is configured to prevent a ventilation air flow leakage in the region of the at least one condense water outlet.

12. The aircraft according to claim 11, wherein at least one associated outlet cover is adapted for allowing a condense water stream inside the integrated ventilation air duct in a direction that is opposed to a ventilation air stream generated by the ventilation air.

13. A helicopter cockpit framework comprising:
a plurality of frame beams integrally formed as a unitary, load-bearing, complex curved geometrical structure comprising fiber reinforced polymers in one composite piece, the plurality of frame beams cooperating to define a first aperture sized to receive a main window, a second aperture sized to receive a secondary window, and a third aperture sized to receive a door frame;
wherein at least one of the plurality of frame beams is hollow such that an inner wall surface defines an integrated air duct, the integrated air duct having an inlet configured to receive ventilation air from a helicopter ventilation system, the duct extending from the inlet to a first outlet, a second outlet, and a third outlet;
wherein the first outlet is positioned adjacent to the first aperture and configured to expel ventilation air onto the main window;
wherein the second outlet is positioned adjacent to the second aperture and configured to expel ventilation air onto the secondary window;
wherein the third outlet is positioned adjacent to a presumed pilot location and configured to expel ventilation air onto the presumed pilot location;
wherein the at least one of the plurality of frame beams is curved and extends upwardly from a lower region of the cockpit framework and alongside the first, second, and third apertures; and
wherein the at least one of the plurality of frame beams defines a condense water drain therethrough, the condense water drain intersecting the duct.

14. The helicopter cockpit framework of claim 13 further comprising an outlet cover associated with the condense water drain, the outlet cover connected to the inner surface of the duct and extending in a direction of flow of the ventilation air to prevent a ventilation air flow leakage in the region of the condense water drain by allowing a condense water stream inside the integrated air duct to flow into the condense water drain in a direction that is opposed to the direction of flow of the ventilation air.

15. The helicopter cockpit framework of claim 14 wherein the first outlet and the second outlet are each provided with a static nozzle; and wherein the third outlet is provided with an adjustable nozzle.

16. The helicopter cockpit framework of claim 15 further comprising an internal scoop connected to the inner surface of the duct adjacent to the third outlet, the internal scoop configured to define and direct a predetermined air mass flow towards the adjustable nozzle.

17. The helicopter cockpit framework of claim 15 wherein the duct is lined with an inner air duct insulation.

18. A rotary wing aircraft comprising:
a cockpit framework structure provided by a plurality of frame beams integrally formed as a unitary, load-bearing, complex curved geometrical structure comprising fiber reinforced polymers in one composite piece, wherein at least one of the plurality of frame beams is hollow such that an inner wall surface defines an integrated air duct, the integrated air duct having an inlet configured to receive ventilation air from a helicopter ventilation system, the duct extending from the inlet to a first outlet with a first static nozzle, a second outlet with a second static nozzle, and a third outlet with an adjustable nozzle and an associated internal scoop, wherein a condense water outlet is defined by the at least one of the plurality of frame beams and intersects the duct to provide a drain, and wherein an outlet cover is associated with the condense water outlet and positioned within the duct;
a main window supported by the cockpit framework structure;
a secondary window supported by the cockpit framework structure;
a door frame connected to and supported by the cockpit framework structure; and
a subfloor supported by the cockpit framework, the subfloor having at least one longitudinal frame integrated air duct connecting an air-generating ventilation system to the integrated air duct of the cockpit framework and providing ventilation air thereto;
wherein the first outlet is positioned adjacent to the main window such that the first static nozzle is configured to direct ventilation air towards the main window;
wherein the second outlet is positioned adjacent to the secondary window such that the second static nozzle is configured to direct ventilation air towards the secondary window; and
wherein the third outlet is positioned adjacent to a presumed pilot location such that the adjustable nozzle is configured to direct ventilation air towards the presumed pilot location.

19. The rotary wing aircraft of claim 18 further comprising an insulation layer provided on the inner surface of the at least one of the plurality of frame beams to thermally insulate the integrated air duct.

20. The rotary wing aircraft of claim 18 wherein the duct of the cockpit framework structure extends from the inlet to a fourth outlet with another adjustable nozzle and another associated internal scoop;
wherein the fourth outlet is positioned adjacent to the presumed pilot location such that the another adjustable nozzle is configured to direct ventilation air towards the presumed pilot location;
wherein the third outlet is positioned adjacent to a side region of the main window;
wherein the fourth outlet is positioned adjacent to a top region of the main window; and
wherein a geometrical shape of the internal scoop associated with the third outlet is different than a geometrical shape of the scoop associated with the fourth outlet.

* * * * *